United States Patent
Kim et al.

(10) Patent No.: US 11,304,031 B2
(45) Date of Patent: Apr. 12, 2022

(54) WIRELESS LOCAL AREA NETWORK SYSTEM, METHOD OF TRANSMITTING DISTANCE INFORMATION AND MEASURING DISTANCE OF WIRELESS LOCAL AREA NETWORK SYSTEM

(71) Applicant: Samsung Electronics Co., Ltd., Suwon-si (KR)

(72) Inventors: Myeongjin Kim, Seoul (KR); Jinyong Lee, Seoul (KR); Sungsoo Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/984,568

(22) Filed: Aug. 4, 2020

(65) Prior Publication Data
US 2021/0112369 A1    Apr. 15, 2021

(30) Foreign Application Priority Data

Oct. 10, 2019  (KR) .................. 10-2019-0125470
May 8, 2020    (KR) .................. 10-2020-0054942

(51) Int. Cl.
*H04W 4/02* (2018.01)
*G01S 13/76* (2006.01)

(52) U.S. Cl.
CPC .......... *H04W 4/023* (2013.01); *G01S 13/765* (2013.01)

(58) Field of Classification Search
CPC ............................ H04W 4/023; G01S 13/765
See application file for complete search history.

(56) References Cited

U.S. PATENT DOCUMENTS

| | | | |
|---|---|---|---|
| 9,781,566 B1* | 10/2017 | Rison | H04L 43/0864 |
| 9,907,044 B2 | 2/2018 | Zhang et al. | |
| 10,200,964 B2 | 2/2019 | Amizur | |
| 2014/0355462 A1* | 12/2014 | Aldana | H04W 4/029 370/252 |
| 2017/0023660 A1* | 1/2017 | Amizur | H04B 7/0623 |
| 2017/0048671 A1* | 2/2017 | Marri Sridhar | H04W 4/023 |
| 2017/0127412 A1* | 5/2017 | Amizur | G01S 5/00 |
| 2017/0251332 A1* | 8/2017 | Aldana | G01S 5/0009 |
| 2017/0261591 A1* | 9/2017 | Zhang | G01S 5/14 |
| 2018/0011179 A1* | 1/2018 | Zhang | H04L 69/22 |
| 2018/0310194 A1 | 10/2018 | Yang | |
| 2018/0335514 A1 | 11/2018 | Dees et al. | |

(Continued)

*Primary Examiner* — Ernest G Tacsik
(74) *Attorney, Agent, or Firm* — Harness, Dickey & Pierce, P.L.C.

(57) ABSTRACT

Disclosed is a method of transmitting a message for measuring a distance between a first terminal and a second terminal that are positioned in a basic service set (BSS), and in this case, the first terminal transmits a fine timing measurement (FTM) request frame for beginning of measurement of a distance to second terminal. The first terminal receives an Ack frame for the FTM request frame from the second terminal. The first terminal transmits a first data frame to the second terminal, by the first terminal. The first terminal receives a first Ack frame for the first data frame from the second terminal, by the first terminal. The first terminal transmits a second data frame but not the FTM frame to the second terminal. The first terminal receives a second Ack frame for the second data frame from the second terminal.

20 Claims, 12 Drawing Sheets

(56) References Cited

U.S. PATENT DOCUMENTS

| | | | |
|---|---|---|---|
| 2019/0041509 A1* | 2/2019 | Jiang | H04W 24/10 |
| 2019/0059014 A1 | 2/2019 | Sanderovich et al. | |
| 2019/0141556 A1* | 5/2019 | Kash | H04W 16/28 |
| 2019/0182793 A1* | 6/2019 | Wang | H04B 7/06 |
| 2019/0306825 A1* | 10/2019 | Lindskog | H04W 24/08 |
| 2020/0068520 A1* | 2/2020 | Marri Sridhar | G01S 13/765 |
| 2020/0314220 A1* | 10/2020 | Segev | G01S 5/021 |

\* cited by examiner

FIG. 10

| L-STF | L-LTF | L-SIG | VHT-SIG-A | VHT-STF | LTF$_k$ | exp(j$\Theta$)*LTF$_k$ | VHT-SIG-B |

WIRELESS LOCAL AREA NETWORK SYSTEM, METHOD OF TRANSMITTING DISTANCE INFORMATION AND MEASURING DISTANCE OF WIRELESS LOCAL AREA NETWORK SYSTEM

CROSS-REFERENCE TO RELATED APPLICATION

This application claims the benefit of priority, under 35 U.S.C. § 119, from Korean Patent Application No. 10-2019-0125470, filed on Oct. 10, 2019, and Korean Patent Application No. 10-2020-0054942, filed on May 8, 2020 the disclosure of each of which is incorporated herein by reference in its entirety.

BACKGROUND

1. Field

The present disclosure relates to a wireless local area network (WLAN) system, and a method of transmitting distance information and measuring a distance of the WLAN system.

2. Description of Related Art

A distance between a first terminal STA1 and a second terminal STA2 is measured using a fine timing measurement (FTM) scheme in a general wireless local area network (WLAN) system. In order to measure the distance between the first terminal STA1 and the second terminal STA2 using the FTM scheme, an FTM frame is transmitted and received several times, and a time of arrival (TOA) value and a time of departure (TOD) value are transmitted and received.

SUMMARY

Example embodiments of the present disclosure provide a wireless local area network (WLAN) system, and a method of transmitting a message and measuring a distance of the WLAN system for reducing wastage of data resources (e.g., bandwidth) when distances between an access point (AP) and terminals are measured.

Example embodiments of the present disclosure provide a wireless local area network (WLAN) system, and a method of transmitting a message and measuring a distance of the WLAN system for transmitting and receiving a time of arrival (TOA) value and a time of departure (TOD) value using frames other than an FTM frame when a distance between an access point (AP) and a terminal, and a distance between terminals, are measured.

In accordance with an aspect of the present disclosure, some example embodiments provide a method of transmitting a message for measuring a distance between a first terminal and a second terminal, the first terminal and the second terminal being in a basic service set (BSS). The method includes transmitting a fine timing measurement (FTM) request frame to the second terminal by the first terminal, receiving an Ack frame associated with the FTM request frame from the second terminal by the first terminal, transmitting a first data frame to the second terminal by the first terminal, the first data frame not being a fine timing measurement (FTM) frame, receiving an Ack frame associated with the first data frame from the second terminal by the first terminal, transmitting a second data frame to the second terminal by the first terminal, the second data frame not being the FTM frame, and receiving an Ack frame associated with the second data frame from the second terminal by the first terminal, the Ack frame associated with the second data frame including a time of arrival (TOA) value of the second terminal and a time of departure (TOD) value of the second terminal.

In accordance with some example embodiments, there is provided a method of measuring a distance between a first terminal and a second terminal, the first terminal and the second terminal being in a basic service set (BSS). The method includes transmitting a first data frame to the second terminal by the first terminal, the first data frame not being a fine timing measurement (FTM) frame, receiving a first Ack frame from the second terminal by the first terminal, transmitting an second data frame to the second terminal by the first terminal, the second data frame not being the FTM frame, receiving a second Ack frame for the second data frame from the second terminal, acquiring a time of arrival (TOA) value and a time of departure (TOD) value of the second terminal by the first terminal based on the second Ack frame, and measuring a distance between the first terminal and the second terminal based on the TOD value and the TOA value of the second terminal.

In accordance with some example embodiments, there is provided a wireless local area network (WLAN) system including a first terminal in a basic service set (BSS), and a second terminal in the BSS, wherein the first terminal is configured to, transmit a first data frame to the second terminal, the first data frame not being a fine timing measurement (FTM) frame, receive first Ack frame for the first data frame from the second terminal, transmit second data frame to the second terminal, the second data frame not being the FTM frame, and receive second Ack frame for the second data frame from the second terminal, the second Ack frame including a time of arrival (TOA) value and a time of departure (TOD) value of the second terminal.

BRIEF DESCRIPTION OF THE DRAWINGS

The above and other objects, features and other advantages of the present disclosure will be more clearly understood from the following detailed description taken in conjunction with the accompanying drawings, in which:

FIG. 10 is a diagram illustrating an example of a null data packet (NDP) frame including a time of arrival (TOA) value and/or a time of departure (TOD) value.

DETAILED DESCRIPTION

Hereafter, a wireless local area network (WLAN) system, and a method of transmitting a message and measuring a distance of the WLAN system, according to embodiments of the present disclosure will be described with reference to the accompanying drawings.

Figure 1:
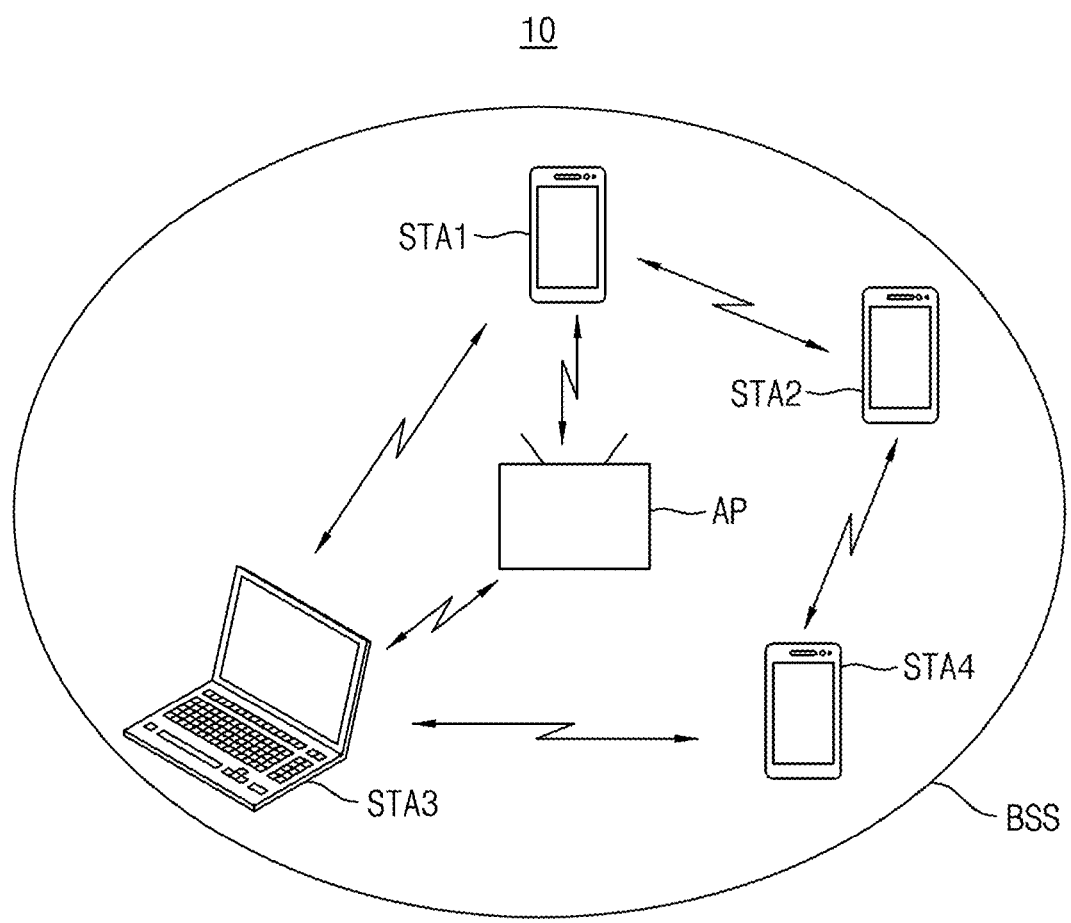
FIG. 1 is a diagram illustrating a WLAN system 10 according to an embodiment of the present disclosure.

FIG. 1 is a diagram illustrating a WLAN system 10 according to an embodiment of the present disclosure.

Referring to FIG. 1, the WLAN system 10 according to an embodiment of the present disclosure may include a plurality of terminals STA1 to STA4 and one or more access points (APs). For example, the access point AP may be a wireless access device.

The plurality of terminals STA1 to STA4 and the access point AP may be connected to each other using a wireless local area network (WLAN) (e.g., Wi-Fi) in a basic service set (BSS). The plurality of terminals STA1 to STA4 and the access point AP may transmit and receive data to and from each other using a wireless local area network (WLAN) method.

For example, data may be transmitted and received between the plurality of terminals STA1 to STA4 and the access point AP in a frequency band of 2.4 GHz and a frequency band of 5 GHz using a Wi-Fi method based on IEEE 802.11a, IEEE 802.11g, IEEE 802.11n, IEEE 802.11ac, and/or IEEE 802.11ax standards.

The plurality of terminals STA1 to STA4 and the access point AP may be connected to a backbone network in a wired or wireless manner. For example, each of the plurality of terminals STA1 to STA4 may be connected to the Internet through the access point AP. The access point AP may include a service set identifier (SSID) assigned in a network. In order to search whether the access point AP is present in a BSS, the plurality of terminals STA1 to STA4 may scan the access point AP. When the plurality of access points AP are present in one BSS, the plurality of terminals STA1 to STA4 may check SSIDs of the access points AP and may access a specific access point AP.

When frame is transmitted from a transmission end (e.g., STA1 or AP) and received by a reception end (e.g., STA2 or AP), a distance between the transmission end and the reception end may be measured using TOA information, corresponding to a time for receiving a frame, and TOD information, corresponding to a time for transmitting a frame, in terms of the transmission end and the reception end.

The present disclosure provides a method of transmitting and receiving TOA information and TOD information between a plurality of terminals as a new method using other frames other than a general fine timing measurement (FTM) frame in the WLAN system 10. That is, the present disclosure proposes a method of measuring a distance between the transmission end and the reception end during transmission and reception of data between a plurality of terminals.

Figure 2:
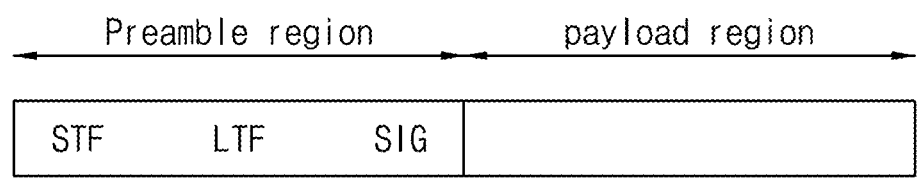
FIG. 2 is a diagram showing a frame format of a physical layer transmitted and received between a terminal and an AP or between terminals in a wireless local area network (WLAN) system.

FIG. 2 is a diagram showing a frame format of a physical layer transmitted and received between a terminal and an AP or between terminals in a wireless local area network (WLAN) system. A frame may include a preamble region and a payload region. The preamble region may include a short training field (STF) and a long training field (LTF). The STF and the LTF may be used for synchronization and channel equalization of a transmission and reception device. In addition, a preamble field may further include a signaling field (SIG). The SIG may include control information including a data rate of a payload region, or the like. The payload region may include information to be actually transmitted and received between transmission and reception devices. According to information of a frame type included in the payload region, a WLAN frame may be classified into a management frame, a control frame, or a data frame. The present disclosure may provide a method of transmitting and receiving TOA information and TOD information using a LTF symbol or a SIG symbol of a preamble region.

Figure 3A:
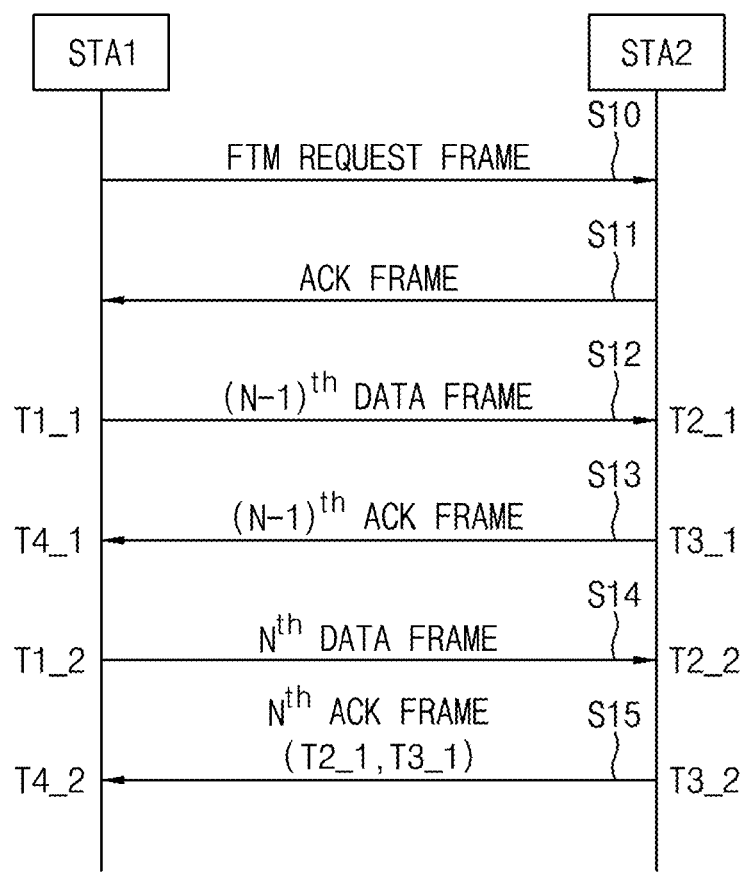
FIG. 3A is a flowchart of a method of transmitting and receiving a time of arrival (TOA) value and a time of departure (TOD) value between terminals STAs using a data frame.
Figure 3B:
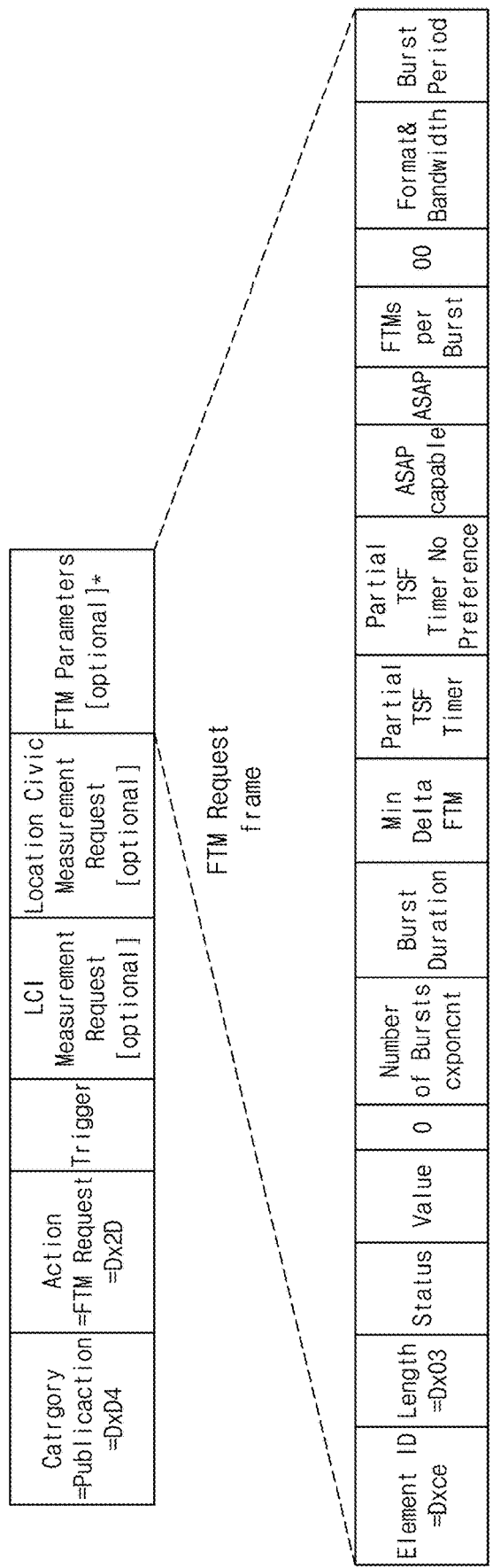
FIG. 3B is a diagram illustrating a fine timing measurement (FTM) request frame.

FIG. 3A is a flowchart of a method of transmitting and receiving a time of arrival (TOA) value and a time of departure (TOD) value between terminals STAs using an Ackframe. FIG. 3B is a diagram illustrating a payload region of a fine timing measurement (FTM) request frame.

Referring to FIGS. 3A and 3B, for data transmission between a first terminal STA1 and a second terminal STA2, and power and resource management, a distance 'd' between the first terminal STA1 and the second terminal STA2 needs to be measured. The distance 'd' between the first terminal STA1 and the second terminal STA2 may be measured from the first terminal STA1 or may be measured from the second terminal STA2. FIG. 3A illustrates an example in which the distance 'd' is measured from the first terminal STA1. According to some example embodiments, operations described herein as being performed by the first terminal STA1 and/or the second terminal STA2 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the first terminal STA1 and/or the second terminal STA2 may be the same as or similar to the terminal 200 discussed below in association with FIG. 12.

In order to begin to measure the distance 'd' between the first terminal STA1 and the second terminal STA2, the first terminal STA1 may generate a fine timing measurement (FTM) request frame shown in FIG. 3B. The first terminal STA1 may transmit the FTM request frame to the second terminal STA2 (S10).

The second terminal STA2 may receive the FTM request frame from the first terminal STA1. The second terminal STA2 may transmit an Ack frame for checking beginning of measurement of the distance 'cl' to the first terminal STA1. The second terminal STA2 may transmit the Ack frame to the first terminal STA1, and the first terminal STA1 may receive the Ack frame to begin measurement of the distance 'cl' between the first terminal STA1 and the second terminal STA2 (S11). According to some example embodiments, the second terminal STA2 may generate and/or transmit an Ack frame associated with the FTM request frame in response to receiving the FTM request frame.

In an embodiment, measurement of the distance 'cl' between the first terminal STA1 and the second terminal STA2 may be initiated using other frames transmitted and received in a WLAN method without use of the FTM request frame.

Subsequently, the first terminal STA1 may generate an $(N-1)^{th}$ data frame (e.g., a first data frame) but not an FTM frame and may transmit the generated $(N-1)^{th}$ data frame to the second terminal STA2 (e.g., where N may be an integer such as 2, 3, 4, etc.). According to some example embodiments, the first terminal STA1 may generate and/or transmit the $(N-1)^{th}$ data frame in response to receiving the Ack frame associated with the FTM request frame. The first terminal STA1 may acquire (e.g., determine, estimate, calculate, etc.) a first TOD T1_1 (e.g., a time at which the $(N-1)^{th}$ data frame is transmitted) value of the first terminal STA1, which is related to the time for transmitting the $(N-1)^{th}$ data frame. The second terminal STA2 may receive the $(N-1)^{th}$ data frame from the first terminal STA1. The second terminal STA2 may acquire (e.g., determine, estimate, calculate, etc.) a first TOA T2_1 (e.g., a time at which the $(N-1)^{th}$ data frame is received) value of the second terminal STA2, which is related to the time for receiving the $(N-1)^{th}$ data frame (S12).

Subsequently, the second terminal STA2 may generate an $(N-1)^{th}$ Ack frame for the $(N-1)^{th}$ data frame. The second terminal STA2 may transmit the $(N-1)^{th}$ Ack frame to the first terminal STA1. In this case, the second terminal STA2 may acquire (e.g., determine, estimate, calculate, etc.) a first TOD T3_1 (e.g., a time at which the $(N-1)^{th}$ Ack frame is transmitted) value of the second terminal STA2, which is related to the time for transmitting the $(N-1)^{th}$ Ack frame (S13). According to some example embodiments, the second terminal STA2 may generate and/or transmit the $(N-1)^{th}$ Ack frame associated with the $(N-1)^{th}$ data frame in response to receiving the $(N-1)^{th}$ data frame.

Subsequently, the first terminal STA1 may receive the $(N-1)^{th}$ Ack frame from the second terminal STA2. The first terminal STA1 may acquire (e.g., determine, estimate, calculate, etc.) a first TOA T4_1 (e.g., a time at which the $(N-1)^{th}$ Ack frame is received) value of the first terminal STA1, which is related to the time for receiving the $(N-1)^{th}$ Ack frame.

Subsequently, the first terminal STA1 may generate an $N^{th}$ data frame (e.g., a second data frame) but not the FTM frame. The first terminal STA1 may transmit the $N^{th}$ data frame to the second terminal STA2. In this case, the first terminal STA1 may acquire (e.g., determine, estimate, calculate, etc.) a second TOD T1_2 (e.g., a time at which the $N^{th}$ data frame is transmitted) value of the first terminal STA1, which is related to the time for transmitting the $N^{th}$ data frame (S14). According to some example embodiments, the first terminal STA1 may generate and/or transmit the $N^{th}$ data frame in response to receiving the Ack frame associated with the $(N-1)^{th}$ data frame.

Subsequently, the second terminal STA2 may receive the $N^{th}$ data frame from the first terminal STA1. In this case, the second terminal STA2 may acquire (e.g., determine, estimate, calculate, etc.) a second TOA T2_2 (e.g., a time at which the $N^{th}$ data frame is received) value of the second terminal STA2, which is related to the time for receiving the $N^{th}$ data frame.

Subsequently, the second terminal STA2 may include the first TOA T2_1 value of the second terminal STA1 and the first TOD T3_1 value of the second terminal STA2 in a preamble region of the $N^{th}$ Ack frame. The second terminal STA2 may transmit the $N^{th}$ Ack frame including the first TOA T2_1 value and the first TOD T3_1 value in a preamble region to the first terminal STA1. In this case, the second terminal STA2 may acquire (e.g., determine, estimate, calculate, etc.) a second TOD T3_2 (e.g., a time at which the $N^{th}$ Ack frame is transmitted) value of the second terminal STA2, which is related to the time for transmitting the $N^{th}$ Ack frame (S15). According to some example embodiments, the second terminal STA2 may generate and/or transmit the $N^{th}$ Ack frame associated with the $N^{th}$ data frame in response to receiving the $N^{th}$ data frame.

Subsequently, the first terminal STA1 may receive the $N^{th}$ Ack frame from the second terminal STA2. The $N^{th}$ Ack frame received by the first terminal STA1 may include the first TOA T2_1 value of the second terminal STA2 and the first TOD T3_1 value of the second terminal STA2. In this case, the first terminal STA1 may acquire (e.g., determine, estimate, calculate, etc.) a second TOA T4_2 (e.g., a time at which the $N^{th}$ Ack frame is received) value of the first terminal STA1, which is related to a time for receiving the $N^{th}$ Ack frame. The first terminal STA1 may receive the $N^{th}$ Ack frame from the second terminal STA2 and may acquire (e.g., determine, estimate, calculate, etc.) the first TOA T2_1 value and the first TOD T3_1 value of the second terminal STA2 from the $N^{th}$ Ack frame.

Here, a type of the $(N-1)^{th}$ data frame and $N^{th}$ frame that are transmitted to the second terminal STA2 from the first terminal STA1 are not limited, and any data frame except for an FTM frame may be applied in a WLAN (e.g., Wi-Fi) method.

Figure 3C:
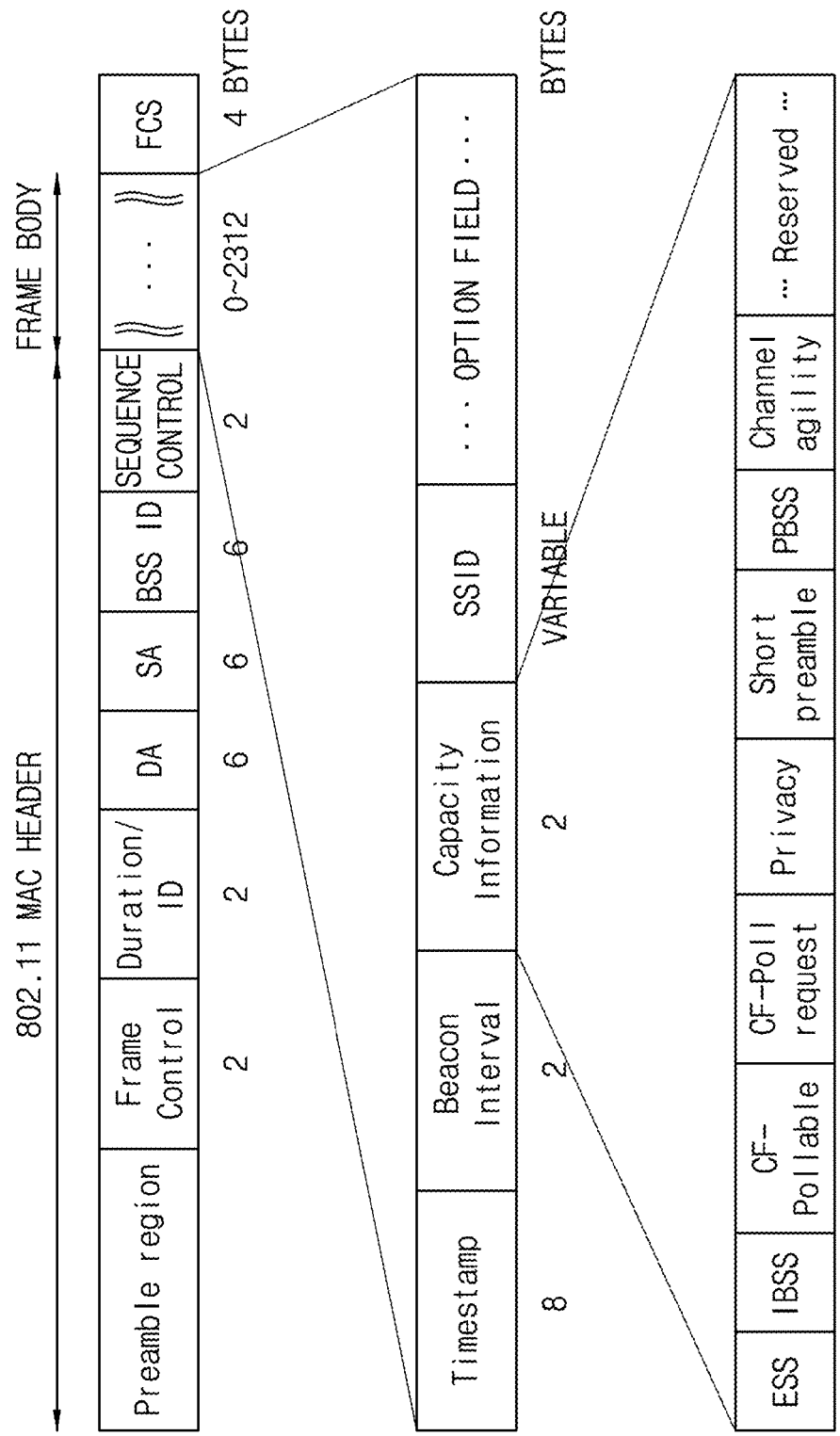
FIG. 3C is a diagram illustrating a beacon frame.

FIG. 3C is a diagram illustrating a beacon frame.

Referring to FIGS. 1 and 3C, the case in which a distance between the access point AP and the first terminal STA1 is measured may be considered. The distance between the access point AP and the first terminal STA1 may be measured using a beacon frame transmitted by the access point AP.

A frequency band of 2.4 GHz may be divided into 13 channels. The access point AP may select one of the 13 channels and may communicate with terminals STAs in a frequency band of the selected channel. The terminals STAs (e.g., the plurality of terminals STA1 to STA4) may check the 13 channels and may identify an access point AP present in a BSS to which the corresponding terminal STA belongs. In order to indicate that the access point AP is present in the BSS, the access point AP may transmit a beacon frame to a currently used channel (e.g., the channel selected from among the 13 channels) for each period. The first terminal STA1 may receive the beacon frame from the access point AP and may acquire an SSID of the access point AP, a media access control (MAC) address of the access point AP, a used channel type, and/or signal intensity. According to some example embodiments, operations described herein as being performed by the access point AP, the third terminal STA3 and/or the fourth terminal STA4 may be performed by processing circuitry. For example, the access point AP may be the same as or similar to the access point 100 discussed below in association with FIG. 12, and the third terminal STA3 and/or the fourth terminal STA4 may be the same as or similar to the terminal 200 discussed below in association with FIG. 12.

The access point AP may transmit the FTM request frame to the first terminal STA1, and the first terminal STA1 may transmit the Ack frame to the access point AP to begin distance measurement. According to some example embodiments, the first terminal STA1 may generate and/or transmit the Ack frame associated with the FTM request frame in response to receiving the FTM request frame.

The access point AP may transmit (e.g., broadcast) a beacon frame to terminals (STAs) in the BSS. The access point AP may include a TOA value and/or a TOD value of the access point AP in a preamble region of the beacon frame and may transmit the beacon frame to the first terminal STA1. According to some example embodiments, the access point AP may generate and/or transmit the beacon frame in response to receiving the Ack frame associated with the FTM request frame. According to some example embodiments, the TOA value and/or the TOD value of the access point AP may be included instead of, or in addition to, other information typically included in the capability information field and/or the option field of the beacon frame. For example the first terminal STA1 may generate an Ack frame for the beacon frame and may transmit the Ack frame to the access point AP. According to some example embodiments, the first terminal STA1 may generate and/or transmit the Ack frame associated with the beacon frame in response to receiving the beacon frame. A preamble region of the Ack frame transmitted from the first terminal STA1 may include a TOA value and/or a TOD value of the first terminal STA1. Accordingly, TOA values and TOD values may be transmitted and received between the access point AP and the first terminal STA1, and a distance between the access point AP and the first terminal STA1 may be measured.

For example, a frame body of a MAC header shown in FIG. 3C may include a timestamp, a beacon interval, capability information, a service set identifier (SSID), and option fields. The option fields may include a frequency hopping (FH) parameter set, a direct sequence (DS) parameter set, a contention-free (CF) parameter set, an independent basic service set (IBSS) parameter set, and/or a traffic indicator map (TIM).

The beacon frame may be a management frame periodically transmitted (e.g., broadcasted) to indicate presence of a WLAN according to the IEEE 802.11 standard. Thus, the beacon frame may include various pieces of information. The preamble region of the beacon frame may include TOA information and/or TOD information of the access point AP and may be transmitted to the terminals STAs.

Figure 4:
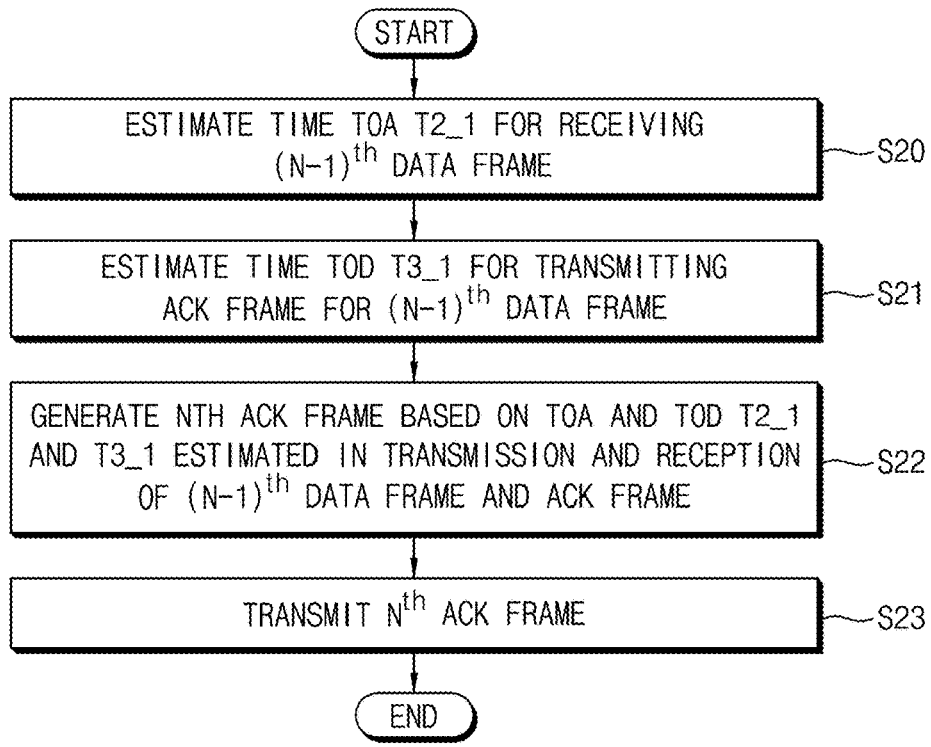
FIG. 4 is a flowchart illustrating a method of generating a frame for transmitting a time of arrival (TOA) value and a time of departure (TOD) value in the second terminal STA2 of FIG. 3A.

FIG. 4 is a flowchart illustrating a method of generating a frame for transmitting a time of arrival (TOA) value and a time of departure (TOD) value in the second terminal STA2 of FIG. 3A. In some example embodiments, the operations described in association with FIG. 4 may be similar to or the same as operations described in association with FIG. 3A. Redundant descriptions between FIGS. 3A and 4 may be omitted.

Referring to FIGS. 3A and 4, it is assumed that an FTM request frame and an Ack frame are transmitted and received between the first terminal STA1 and the second terminal STA2 (e.g., operations S10 and S20 in FIG. 3A) without error.

The second terminal STA2 may receive the $(N-1)^{th}$ data frame from the first terminal STA1. The second terminal STA2 may acquire the first TOA T2_1 value of the second terminal STA2, which is related to the time for receiving the $(N-1)^{th}$ data frame. That is, the second terminal STA2 may estimate the time for the time T2_1 value for receiving the $(N-1)^{th}$ data frame (S20).

Then, the second terminal STA2 may transmit the $(N-1)^{th}$ Ack frame for the $(N-1)^{th}$ data frame to the first terminal STA1. In this case, the second terminal STA2 may acquire the first TOD T3_1 value of the second terminal STA2, which is related to the time for transmitting the $(N-1)^{th}$ Ack frame. That is, the second terminal STA2 may estimate the time T3_1 value for transmitting the $(N-1)^{th}$ Ack frame (S21).

Then, the second terminal STA2 may receive an $N^{th}$ data frame from the first terminal STA1. The second terminal STA2 may generate an $N^{th}$ Ack frame for the received $N^{th}$ data frame. In this case, the second terminal STA2 may generate the $N^{th}$ Ack frame including the first TOA T2_1 value and the first TOD T3_1 value (S22).

Then, the second terminal STA2 may transmit the $N^{th}$ Ack frame including the first TOA T2_1 value and the first TOD T3_1 value to the first terminal STA1 (S23).

Figure 5:
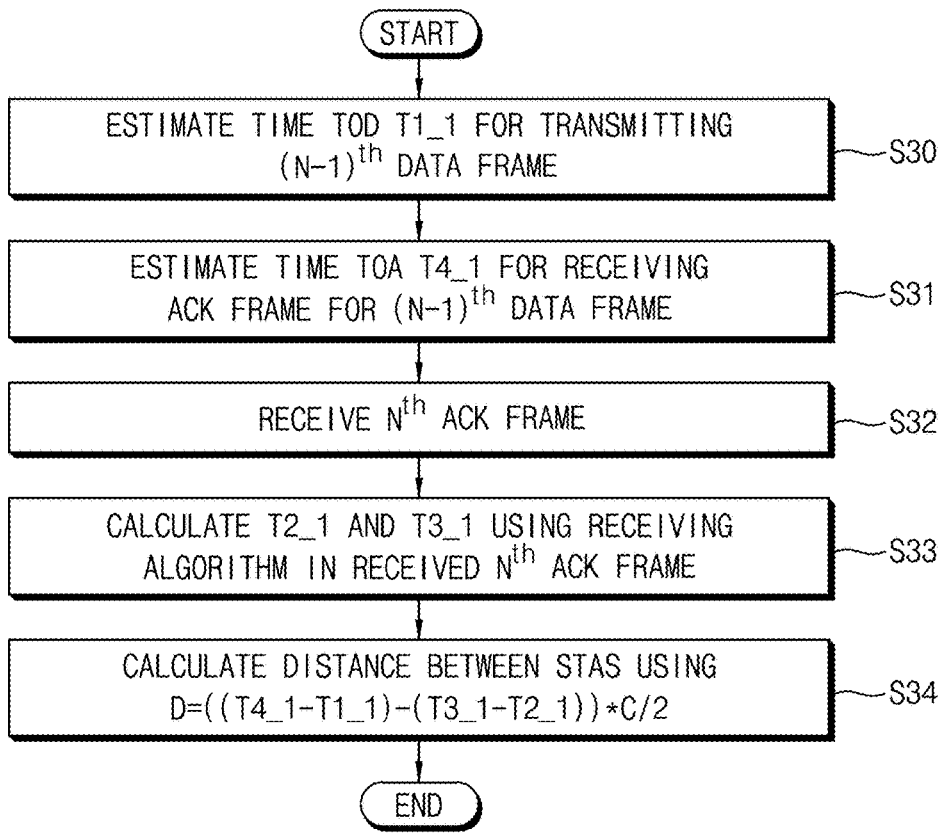
FIG. 5 is a flowchart illustrating a method of measuring a distance between terminals STAs using an Ack frame received by the first terminal STA1 from the second terminal STA2.

FIG. 5 is a flowchart illustrating a method of measuring a distance between terminals STAs using an Ack frame received by the first terminal STA1 from the second terminal STA2. In some example embodiments, the operations described in association with FIG. 5 may be similar to or the same as operations described in association with FIG. 3A. Redundant descriptions between FIGS. 3A and 5 may be omitted.

Referring to FIGS. 3A and 5, the first terminal STA1 may transmit the $(N-1)^{th}$ data frame to the second terminal STA2. In this case, the first terminal STA1 may acquire the first TOD T1_1 value of the first terminal STA1, which is related to a time for transmitting the $(N-1)^{th}$ data frame to the second terminal STA2. That is, the first terminal STA1 may estimate the time value T1_1 for transmitting the $(N-1)^{th}$ data frame (S30).

Then, the first terminal STA1 may receive the $(N-1)^{th}$ Ack frame from the second terminal STA2. The first terminal STA1 may acquire the first TOA T4_1 value of the first terminal STA1, which is related to the time for receiving the $(N-1)^{th}$ Ack frame. That is, the first terminal STA1 may estimate the first TOA T4_1 value for receiving the $(N-1)^{th}$ Ack frame (S31).

Then, the first terminal STA1 may transmit the $N^{th}$ data frame to the second terminal STA2 (e.g., operation S14 of FIG. 3A). The second terminal STA2 may transmit the $N^{th}$ Ack frame to the first terminal STA1 (e.g., operation S15 of FIG. 3A). The $N^{th}$ Ack frame transmitted to the first terminal STA1 from the second terminal STA2 may include the first TOA T2_1 value of the second terminal STA2 and the first TOD T3_1 value of the second terminal STA2.

Then, the first terminal STA1 may receive the $N^{th}$ Ack frame from the second terminal STA2 (S32).

Then, the first terminal STA1 may acquire (e.g., calculate) the first TOA T2_1 value of the second terminal STA2 and the first TOD T3_1 value of the second terminal STA2, which are included in the $N^{th}$ Ack frame (e.g., using a receiving algorithm) (S33).

Then, the first terminal STA1 may calculate the distance 'd' between the first terminal STA1 and the second terminal STA2 using Equation 1 below (S34). According to some example embodiments, the first terminal STA1 may calculate the distance 'd' between the first terminal STA1 and the second terminal STA2 in response to receiving the $N^{th}$ Ack frame associated with the $N^{th}$ data frame.

$$d=((T4\_1-T1\_1)-(T3\_1-T2\_1))*c/2 \quad \text{[Equation 1]}$$

In Equation 1, 'c' represent the velocity of light. As disclosed in Equation 1 above, the first terminal STA1 may acquire a first result value by calculating a difference T4_1-T1_1 between the first TOA T4_1 value of the first terminal STA1 and the first TOD T1_1 value of the first terminal STA1. The first terminal STA1 may acquire a second result value by calculating a difference T3_1-T2_1 between the first TOD T3_1 value of the second terminal STA2 and the first TOA T2_1 value of the second terminal STA2. The first terminal STA1 may acquire a third result value by calculating a difference between the first result value and the second result value. The first terminal STA1 may acquire a fourth result value by multiplying the third result value with the velocity of light 'c', and may calculate the distance 'd' between the first terminal STA1 and the second terminal STA2 by dividing the fourth result value by 2.

In conventional wireless communication systems, terminals measure the distances between one another using the FTM scheme. However, in the FTM scheme, each FTM frame includes several values not used for distance measurement in addition to the time of arrival (TOA) value and time of departure (TOD) value. Also, the FTM frames are communicated between the terminals several times. Accordingly, the conventional wireless communication systems transmit extraneous data several times in the process of performing distance measurements using the FTM scheme. As the time spent transmitting this extraneous data increases, opportunities for data transfer are reduced. Thus, the FTM scheme performed by the conventional wireless communication systems results in reduced data transfer efficiency.

However, according to some example embodiments, TOD/TOA values may be transmitted and received between the first terminal STA1 and the second terminal STA2 using a preamble region of a frame different from the FTM frame (e.g., an FTM frame as depicted in FIG. 3B). Accordingly, the distance 'd' between the first terminal STA1 and the second terminal STA2 may be measured without transmitting the extraneous data transmitted by the conventional wireless communication systems, thereby increasing data transfer efficiency of a wireless local area network (WLAN) system.

Hereinafter, with reference to FIGS. 6 and 7, a method of embodying a time of arrival (TOA) value and a time of departure (TOD) value in a preamble region will be described.

Figure 6:
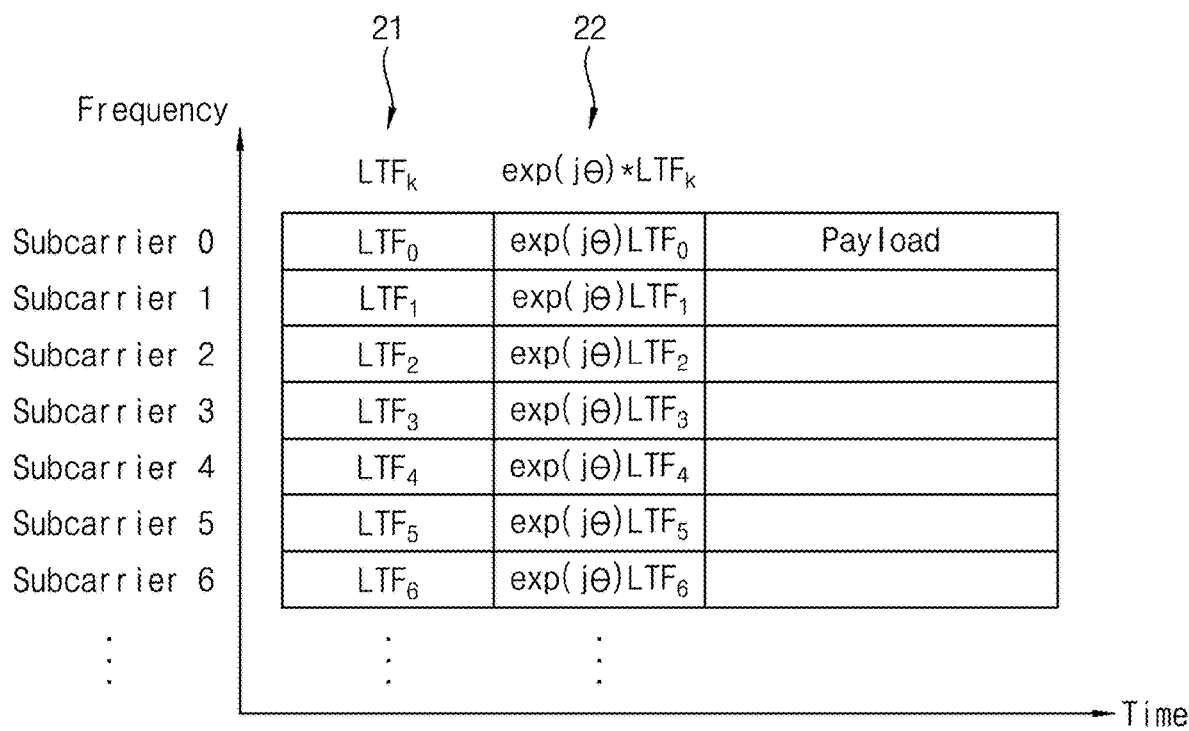
FIG. 6 is a diagram illustrating a method of transmitting and/or receiving a TOA value and/or a TOD value between terminals STAs using a long training field (LTF) symbol and two LTF symbols 20 including a time of arrival (TOA) value and/or a time of departure (TOD) value.

FIG. 6 is a diagram illustrating a method of transmitting and/or receiving a TOA value and/or a TOD value between terminals STAs using long training field (LTF) symbols 21 and 22 of a preamble region. The X-axis denotes a time indicating a sequence of transmitting information and the Y-axis denotes a frequency indicating subcarriers transmitted between terminals. Referring to FIG. 6, when the first terminal STA1 (e.g., a transmission end) transmits a frame to the second terminal STA2 (e.g., a reception end), the plurality of LTF symbols 21 and 22 may be transmitted in a preamble region and then information as a transmission target may be transmitted in a payload region. A sequence value of a first LTF symbol 21 of each subcarrier may be transmitted without change in the same way as the standard defined in the standard of the WLAN and a sequence value of the remaining LTF symbols 22 may be changed and transmitted.

Here, a sequence value of the second LTF symbol 22 may be changed by as much as a phase corresponding to the TOA value and/or the TOD value. That is, the first terminal STA1 may change the sequence value of the second LTF symbol 22 by as much as a phase corresponding to the TOA value and/or the TOD value. The first terminal STA1 may transmit a data frame including the first LTF symbol 21 (e.g., having a sequence value of "$LTF_k$") and the second LTF symbol 22 to the second terminal STA2. The first terminal STA1 may generate the sequence value of the second LTF symbol 22 to have a phase difference corresponding to θ from the sequence value of the first LTF symbol 21 (e.g., "exp(j θ)*$LTF_k$") and may transmit the sequence value of the second LTF symbol 22 to the second terminal STA2.

Figure 7:
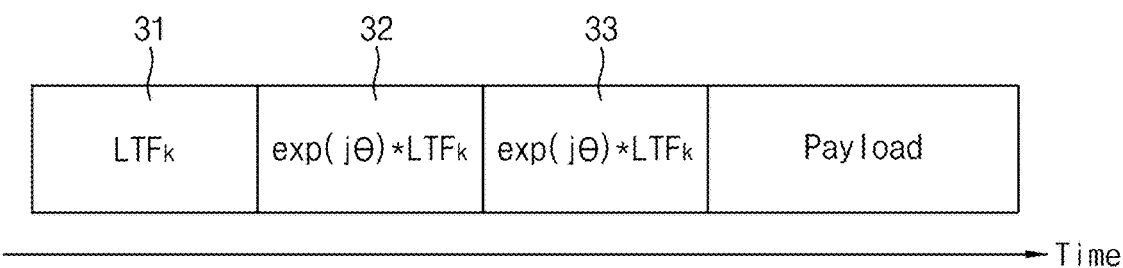
FIG. 7 is a diagram illustrating a method of transmitting and/or receiving a TOA value and/or a TOD value between terminals STAs using a long training field (LTF) and three LTF symbols including a time of arrival (TOA) value and/or a time of departure (TOD) value.

FIG. 7 is a diagram illustrating a method of transmitting and/or receiving a time of arrival (TOA) value and a time of departure (TOD) value between terminals STAs using three LTF symbols 31, 32, and 33 including the TOA value and the TOD value in a preamble region. FIG. 7 indicates information transmitted in a single subcarrier for convenience of description.

Three LTF symbols 31, 32, and 33 may be transmitted to the second terminal STA2 from the first terminal STA1. In this case, a sequence value of a first LTF symbol 31 may be transmitted without change, and a sequence value of a second LTF symbol 32 and a sequence value of a third LTF symbol 33 may be changed and transmitted.

Here, a sequence value of the second LTF symbol 32 may be changed by as much as a phase corresponding to the TOA value and/or the TOD value. That is, the first terminal STA1 may change the sequence value of the second LTF symbol 32 by as much as a phase corresponding to the TOA value and/or the TOD value. The sequence value of the third LTF symbol 33 may be changed by as much as a phase corresponding to the TOA value and/or the TOD value. That is, the first terminal STA1 may change the third LTF symbol 33 by as much as a phase corresponding to the TOA value and/or the TOD value.

The first terminal STA1 may generate a sequence value of the second LTF symbol 32 to have a phase difference corresponding to θ from the sequence value of the first LTF symbol 31 and may transmit the sequence value of the second LTF symbol 32 to the second terminal STA2. The first terminal STA1 may generate a sequence value of the third LTF symbol 33 to have a phase difference corresponding to θ from the sequence value of the first LTF symbol 31 and may transmit the sequence value of the third LTF symbol 33.

In FIGS. 6 and 7, the first terminal STA1 may set a phase difference value θ using Equation 2 below.

$$\theta=(T3\_1)-(T2\_1) \quad \text{[Equation 2]}$$

The second terminal STA2 may receive a data frame including a preamble region including a plurality of LTF symbols. The second terminal STA2 that receives a data frame including a plurality of LTF symbols may estimate a phase difference value (θ) [θ=(T3_1)−(T2_1)] between LTF symbols.

For example, the first terminal STA1 may generate LTF symbols in such a way that all sequence values between the first LTF symbol and the second LTF symbol have a phase difference corresponding to θ (T3_1-T2_1). In this case, the second terminal STA2 may estimate a phase difference value θ by averaging phase difference values of a channel value of a $k^{th}$ subcarrier estimated from a first LTF symbol and a channel value of a $k^{th}$ subcarrier channel value estimated from a second LTF symbol (e.g., where k may be an integer such as 1, 2, 3, etc.). That is, the second terminal STA2 may recognize (T3_1)−(T2_1) by averaging phase difference values between the first LTF symbols 31 and the second LTF symbols 32 of all subcarriers included in a preamble region of a received frame.

Figure 8:
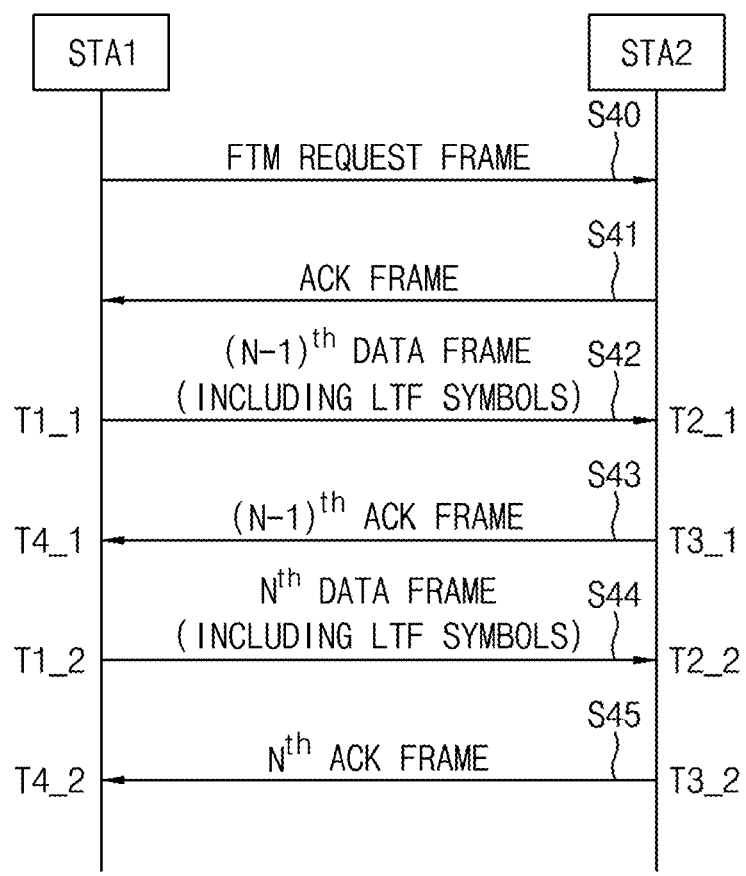
FIG. 8 is a flowchart illustrating a method of transmitting and receiving a time of arrival (TOA) value and/or a time of departure (TOD) value between terminals STAs using a data frame including a long training field (LTF) symbol.

FIG. 8 is a flowchart illustrating a method of transmitting and receiving a time of arrival (TOA) value and/or a time of departure (TOD) value between terminals STAs using a long training field (LTF) symbol in a preamble region of a data frame. In some example embodiments, the operations described in association with FIG. 8 may be similar to or the same as operations described in association with FIG. 3A. Redundant descriptions between FIGS. 3A and 8 may be omitted.

Referring to FIG. 8, the first terminal STA1 may transmit an FTM request frame to the second terminal STA2 and may begin to measure a distance.

In order to begin to measure the distance 'd' between the first terminal STA1 and the second terminal STA2, the first terminal STA1 may transmit the FTM request frame to the second terminal STA2 (S40).

The second terminal STA2 may receive the FTM request frame from the first terminal STA1. The second terminal STA2 that receives the FTM request frame from the first terminal STA1 may transmit an Ack frame for checking beginning of measurement of the distance 'd' to the first terminal STA1. The second terminal STA2 may transmit the Ack frame to the first terminal STA1, and the first terminal STA1 may receive the Ack frame and may begin to measure the distance 'd' between the first terminal STA1 and the second terminal STA2 (S41).

In an embodiment, measurement of the distance 'd' between the first terminal STA1 and the second terminal STA2 may begin to be measured using different data frames transmitted and received in a WLAN method without use of the FTM request frame.

Then, the first terminal STA1 may generate the $(N-1)^{th}$ data frame including the LTF symbols described with reference to FIG. 6 or 7. The first terminal STA1 may transmit the $(N-1)^{th}$ data frame including LTF symbols to the second terminal STA2 (S42).

The first terminal STA1 may acquire the first TOD T1_1 (which is a time for transmitting the $(N-1)^{th}$ data frame) value of the first terminal STA1, which is related to a time for transmitting the $(N-1)^{th}$ data frame including LTF symbols.

The second terminal STA2 may receive the $(N-1)^{th}$ data frame including LTF symbols from the first terminal STA1. The second terminal STA2 may acquire the first TOA T2_1 (which is a time for receiving the $(N-1)^{th}$ data frame) value of the second terminal STA2, which is related to the time for receiving the $(N-1)^{th}$ data frame including LTF symbols.

Then, the second terminal STA2 may generate an $(N-1)^{th}$ Ack frame for the $(N-1)^{th}$ data frame including LTF symbols. The second terminal STA2 may transmit the $(N-1)^{th}$ Ack frame to the first terminal STA1 (S43).

The second terminal STA2 may acquire the first TOD T3_1 (which is a time for transmitting the $(N-1)^{th}$ Ack frame) value of the second terminal STA2, which is related to the time for transmitting the $(N-1)^{th}$ Ack frame.

Then, the first terminal STA1 may receive the $(N-1)^{th}$ Ack frame from the second terminal STA2. The first terminal STA1 may acquire the first TOA T4_1 (which is a time for receiving the $(N-1)^{th}$ Ack frame) value of the first terminal STA1, which is related to the time for receiving the $(N-1)^{th}$ Ack frame.

Then, the first terminal STA1 may generate an $N^{th}$ data frame including LTF symbols using the acquired first TOD T1_1 value (which is a time of transmitting an $(N-1)^{th}$ data frame) thereof and the first TOA T4_1 value (which is a time of receiving an $(N-1)^{th}$ Ack frame) thereof. The first terminal STA1 may transmit the $N^{th}$ data frame including LTF symbols to the second terminal STA2 (S44).

The first terminal STA1 may acquire the second TOD T1_2 (which is a time for transmitting the $N^{th}$ data frame) value of the first terminal STA1, which is related to the time for transmitting the $N^{th}$ data frame including LTF symbols.

Then, the second terminal STA2 may receive the $N^{th}$ data frame from the first terminal STA1. In this case, the second terminal STA2 may acquire the second TOA T2_2 (which is a time for receiving the $N^{th}$ data frame) value of the second terminal STA2, which is related to the time for receiving the $N^{th}$ data frame.

Then, the second terminal STA2 may generate the $N^{th}$ Ack frame. The second terminal STA2 may transmit the $N^{th}$ Ack frame to the first terminal STA1 (S45).

The second terminal STA2 may acquire the second TOD T3_2 (which is a time for transmitting the $N^{th}$ Ack frame) value of the second terminal STA2, which is related to the time for transmitting the $N^{th}$ Ack frame. The first terminal STA1 may receive the $N^{th}$ Ack frame from the second terminal STA2.

The $N^{th}$ data frame received by the second terminal STA2 may include the first TOD T1_1 value and the first TOA T4_1 value of the first terminal STA1.

In the aforementioned operations S40 to S45, when the first terminal STA1 transmits the $(N-1)^{th}$ data frame and the $N^{th}$ data frame including LTF symbols to the second terminal STA2, a sequence value of the first LTF symbol may be transmitted without change. The first terminal STA1 may change a sequence value of next LTF symbols following the first LTF symbol and transmit the changed sequence value of the next LTF symbols to the second terminal STA2. The second terminal STA2 may receive a data frame including LTF symbols. The second terminal STA2 may estimate the phase difference value θ using a difference between the sequence value of the first LTF symbol included in the data frame and the sequence value of next LTF symbols (e.g., the phase difference used to change the sequence value of the next LTF symbols for transmission of the $(N-1)^{th}$ data frame may be different from the phase difference used to change the sequence value of the next LTF symbols for transmission of the $N^{th}$ data frame).

For example, the first terminal STA1 may generate first and second LTF symbols of each subcarrier in such a way that a sequence value of the first LTF symbol of a $k^{th}$ subcarrier and a sequence value of the second LTF symbol of a $k^{th}$ subcarrier have a phase difference of kθ. The first terminal STA1 may transmit a data frame including the LTF symbols to the second terminal STA2. The second terminal STA2 may receive a data frame including LTF symbols. The second terminal STA2 may compare a channel value estimated through a second LTF symbol with a channel value estimated through a first LTF symbol. The second terminal STA2 may estimate the phase difference value θ through a degree by which the channel value estimated through the first LTF symbol and the second LTF symbol is constantly increased according to a subcarrier index k.

For example, the first terminal STA1 may generate LTF symbols in such a way that some sequence values of the first LTF symbol and the second LTF symbol have a phase difference of the TOD T1_1 in some of subcarriers. The first terminal STA1 may generate LTF symbols in such a way that sequence values of the first and second LTF symbols have a phase difference corresponding to the TOA T3_1 in other some of the subcarriers. That is, a data frame may be configured by applying the TOA and the TOD acquired from the corresponding terminal to the second LTF symbol of different subcarriers.

The second terminal STA2 may acquire a first phase difference corresponding to the TOD T1_1 based on some sequence values of the first LTF symbol and the second LTF symbol. The second terminal STA2 may acquire a second phase difference corresponding to the TOA T4_1 based on the remaining sequence values of the first LTF symbol and the second LTF symbol. The second terminal STA2 may estimate the phase difference value θ using the first phase difference and the second phase difference. Accordingly, the second terminal STA2 may also calculate a distance with the first terminal STA1 using the aforementioned Equation 1.

In addition, the second terminal STA2 estimates a [TOD T3_1−TOA T2_1] value, and thus, may generate the Ack frame including LTF symbols of a preamble region to which the [TOD T3_1−TOA T2_1] value is applied. The second terminal STA2 may transmit the generated Ack frame to the first terminal STA1. The first terminal STA1 may receive the transmitted Ack frame from the second terminal STA2 and may acquire the [TOD T3_1−TOA T2_1] value included in the $N^{th}$ Ack frame (e.g., using a receiving algorithm). The first terminal STA1 may calculate the distance 'd' with the second terminal STA2 using Equation 1 above based on the [TOA (T4_1)−TOD (T1_1)] value that is pre-acquired by the first terminal STA1 and the [TOD (T3_1)−TOA (T2_1)] value acquired through the ACK frame.

Here, each terminal may be operated as a transmission end or a reception end depending on a situation, and thus, may generate a data frame or an Ack frame including a preamble region to which a TOA value and a TOD value that are acquired by each terminal are applied, depending on a situation. In order to estimate the TOA value and/or the TOD value, the reception end for receiving the data frame or the Ack frame may generate the data frame or the Ack frame to include the TOA value and the TOD value in a preamble region using a predetermined or determined method. The reception end may receive the data frame or the Ack frame and may estimate the TOA value and/or the TOD value (e.g., through a receiving algorithm predetermined or determined with the transmission end).

Figure 9:
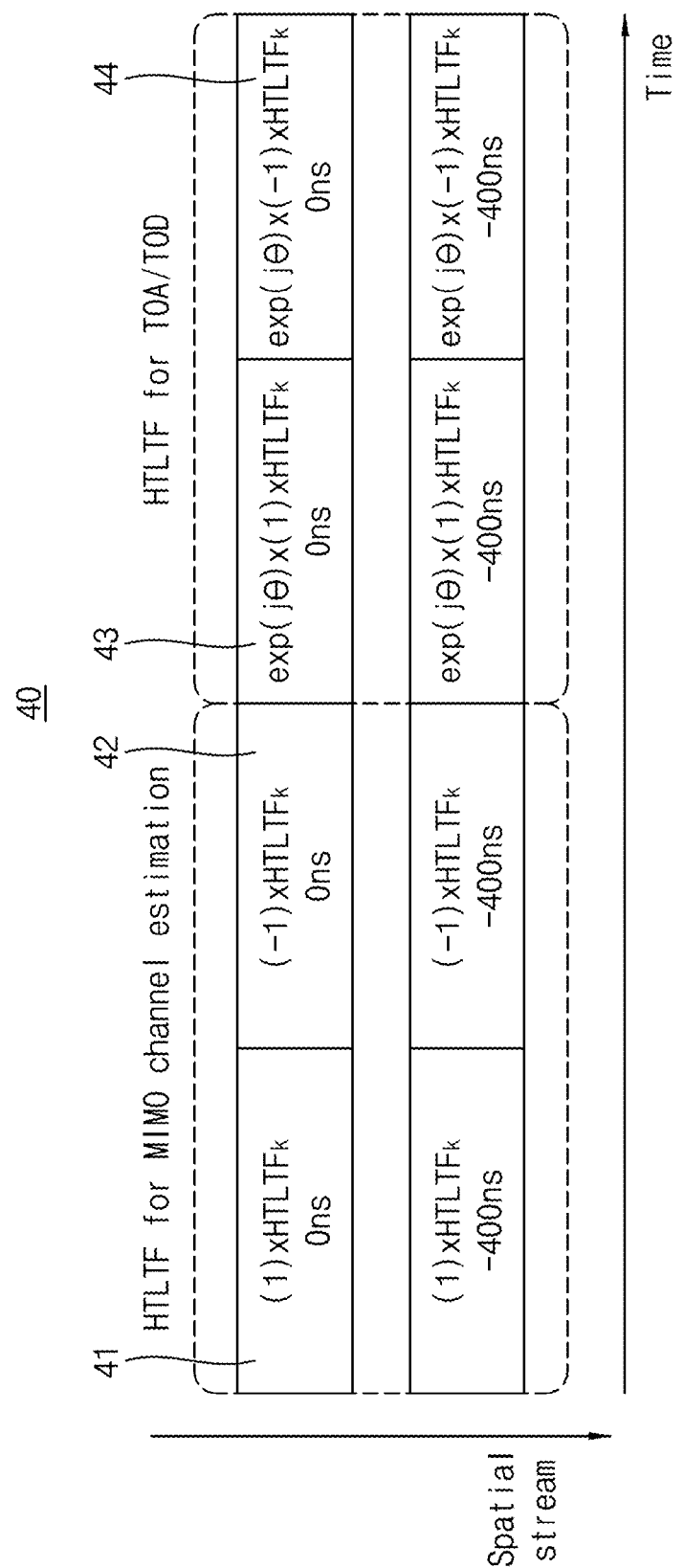
FIG. 9 is a diagram illustrating an example of a long training field (LTF) symbol including a time of arrival (TOA) value and/or a time of departure (TOD) value in a multiple-input and multiple-output (MIMO) environment in which two streams are transmitted using a multiple antenna.

FIG. 9 is a diagram illustrating an example of a long training field (LTF) symbol including a time of arrival (TOA) value and/or a time of departure (TOD) value in a multiple-input and multiple-output (MIMO) environment in which two streams are transmitted using a multiple antenna.

Referring to FIG. 9, two multi-streams may be transmitted and received using a multiple-input and multiple-output (MIMO) method. The transmission end (e.g., the first terminal STA1) may transmit a plurality of high throughput long training fields (HTLTFs) (e.g., 40 times in total) in the time axis.

A first HTLTF 41 and a second HTLTF 42 may be used to estimate a multiple-input and multiple-output (MIMO) channel for decoding data. A third HTLTF 43 and a fourth HTLTF 44 may be used to transmit the TOA value and/or the TOD value.

A first value of a channel may be estimated through the first HTLTF 41 and the second HTLTF 42 (e.g., by the first terminal STA1 and/or the second terminal STA2). For example, the first HTLTF 41 and the second HTLTF 42 may contain information that may be used to estimate the first value of the channel A second value of a channel may be estimated through the third HTLTF 43 and the fourth HTLTF 44 (e.g., by the first terminal STA1 and/or the second terminal STA2). For example, the third HTLTF 43 and the fourth HTLTF 44 may contain information that may be used to estimate the second value of the channel According to some example embodiments, the third HTLTF 43 and the fourth HTLTF 44 may contain a TOA value and a TOD value of the first terminal STA1. Here, a value of a multiple-input and multiple-output (MIMO) channel may have a difference of 0 between the first value of the channel and the second value of the channel. That is, the value of the multiple-input and multiple-output (MIMO) channel may have a difference of a 0 value between a first phase of a channel estimated using the first HTLTF 41 and the second HTLTF 42, and a second phase of a channel estimated using the third HTLTF 43 and the fourth HTLTF 44. As such, even in the multiple-input and multiple-output (MIMO) environment, a phase difference 0 value between the transmission end and the reception end may be estimated. As such, the TOA value and/or TOD value of the transmission end (e.g., the first terminal STA1) and the reception end (e.g., the second terminal STA2) may be transmitted using a method of transmitting a plurality of LTF symbols.

FIG. 10 is a diagram illustrating an example of a null data packet (NDP) frame including a time of arrival (TOA) value and/or a time of departure (TOD) value.

Referring to FIG. 10, the transmission end may generate a null data packet (NDP) frame to include an LTF symbol. The NDP frame transmitted from the transmission end (e.g., the first terminal STA1) may include the TOA value and/or TOD value. The NDP frame including the TOA value and/or TOD value, and the Ack frame for the NDP frame, may be transmitted and received between the transmission end and the reception end (e.g., the second terminal STA2).

In an example of the present disclosure, the TOA value and/or TOD value may be included in the LTF and may be transmitted using an Ack frame, a control frame (e.g., an NDP Announcement frame), and/or a management frame (e.g., a beacon frame).

In an example of the present disclosure, the transmission end may represent the TOD value and/or the TOA value using information bits and may transmit the TOD value and/or the TOA value through a signaling field (SIG) symbol of a preamble region. For example, the TOD value and/or the TOA value may be represented using information bits. For example, a difference value [TOD-TOA] between the TOD value and the TOA value may be represented using information bits. The information bits may be represented using a method predetermined or determined between the transmission end and the reception end.

Figure 11A:
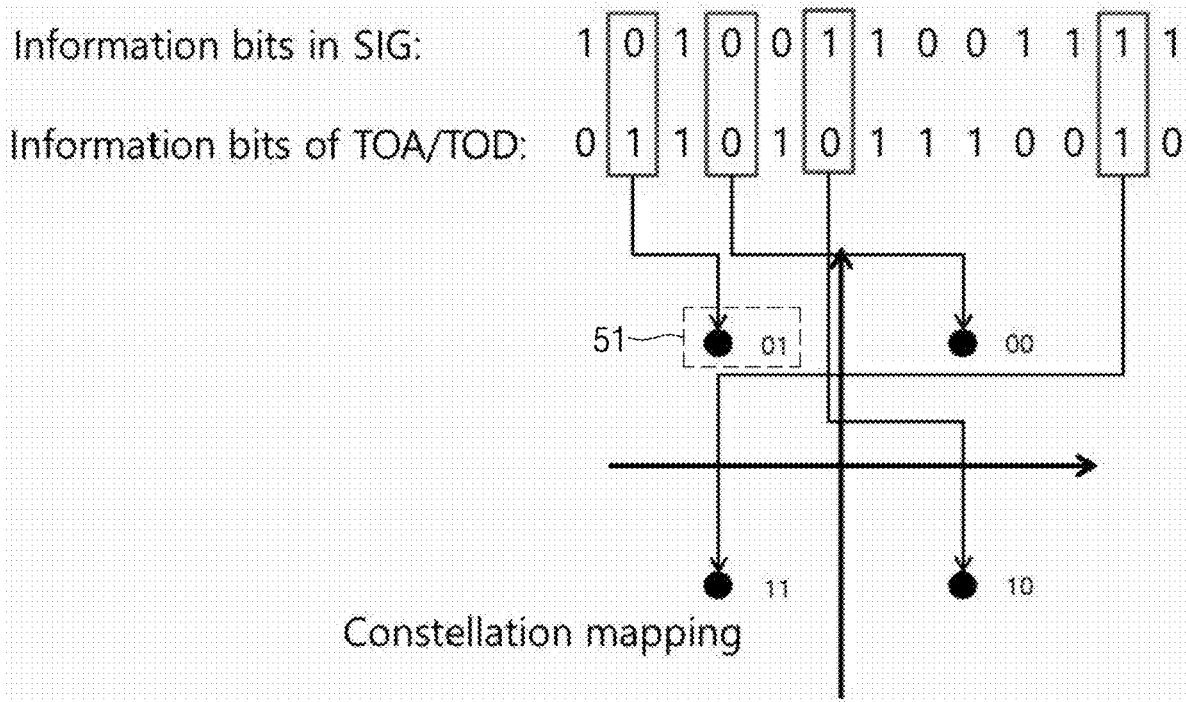
FIG. 11A is a diagram illustrating an example of constellation mapping of a signaling field (SIG) in the case of BPSK modulation of a time of arrival (TOA) value and/or a time of departure (TOD) value.

FIG. 11A is a diagram illustrating an example of constellation mapping of a signaling field (SIG) in the case of Binary Phase Shift Keying (BPSK) modulation of a time of arrival (TOA) value and/or a time of departure (TOD) value.

Referring to FIG. 11A, the TOA value and/or the TOD value of the transmission end (e.g., the first terminal STA1) may be represented using information bits and may be transmitted as a signaling field (SIG) symbol to the reception end (e.g., the second terminal STA2). On the other hand, the TOA value and/or the TOD value of the reception end (e.g., the second terminal STA2) may be represented using information bits and may be transmitted as a signaling field (SIG) symbol to the transmission end (e.g., the first terminal STA1).

The transmission end may perform BPSK modulation on information bits corresponding to the TOA value and/or the TOD value. Constellation mapping may be performed on the TOA value and/or the TOD value to overlap with bits generated by a SIG.

For example, when a bit of a SIG corresponding to a $k^{th}$ subcarrier is [0] and a bit of the TOA/TOD value is [1], the transmission end may generate a symbol 51 corresponding to [01] in constellation.

For example, when a bit of a SIG corresponding to a $k^{th}$ subcarrier is [0] and a bit of the TOA/TOD value is [0], the transmission end may generate a symbol corresponding to [00] in constellation.

For example, when a bit of a SIG corresponding to the $k^{th}$ subcarrier is [1] and a bit of the TOA/TOD value is [0], the transmission end may generate a symbol corresponding to [10] in constellation.

For example, when a bit of a SIG corresponding to the $k^{th}$ subcarrier is [1] and a bit of the TOA/TOD value is [1], the transmission end may generate a symbol corresponding to [11] in constellation.

The data frame including the SIG generated as such may be transmitted from the transmission end (e.g., the first terminal STA1), and the reception end (e.g., the second terminal STA2) may receive the data frame including the SIG. A SIG including the symbol 51 to which the TOA/TOD value is mapped may be demodulated (e.g., by the reception end) using a BPSK demodulation predetermined or determined between the reception end and the transmission end. Here, the reception end may acquire the TOA value and/or the TOD value through a receiving algorithm predetermined or determined with the transmission end.

Figure 11B:
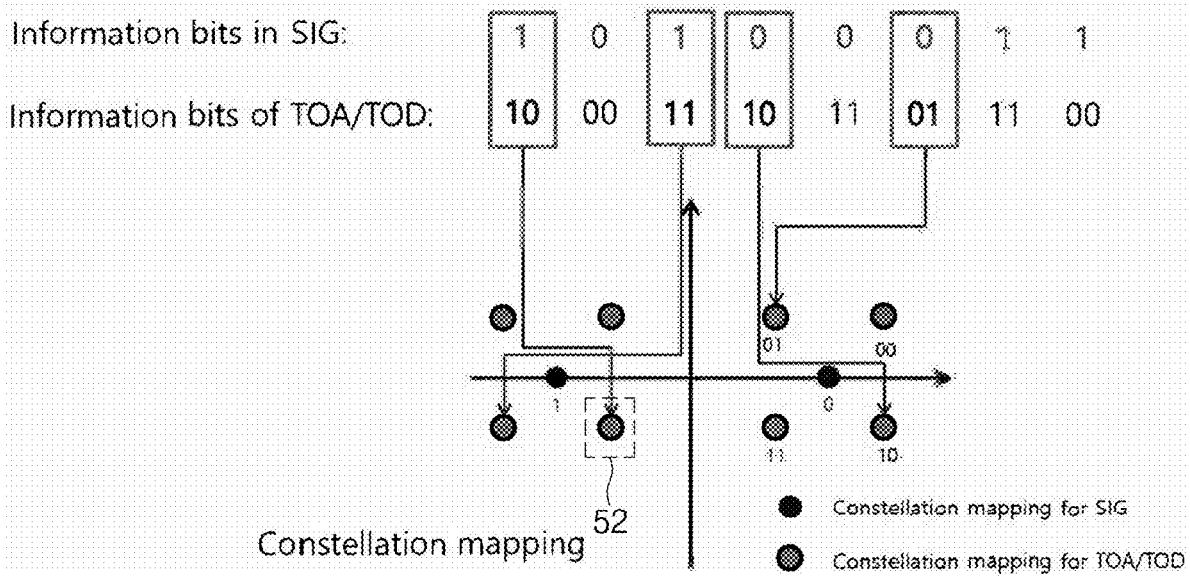
FIG. 11B is a diagram illustrating an example of constellation mapping of a signaling field (SIG) in the case of QPSK modulation of the time of arrival (TOA) value and/or the time of departure (TOD) value.

FIG. 11B is a diagram illustrating an example of constellation mapping of a signaling field (SIG) in the case of Quadrature Phase Shift Keying (QPSK) modulation of the time of arrival (TOA) value and/or the time of departure (TOD) value.

Referring to FIG. 11B, the transmission end may perform QPSK modulation on information bits corresponding to the TOA value and/or the TOD value. Constellation mapping may be performed on the TOA value and/or the TOD value to overlap with bits generated by a SIG.

For example, when a bit of a SIG corresponding to a $k^{th}$ subcarrier is [1] and a bit of the TOA/TOD value is [10], the transmission end may generate a symbol 52 corresponding to [110] in constellation.

For example, when a bit of a SIG corresponding to a $k^{th}$ subcarrier is [1] and a bit of the TOA/TOD value is [11], the transmission end may generate a symbol corresponding to [111] in constellation.

For example, when a bit of a SIG corresponding to the $k^{th}$ subcarrier is [0] and a bit of the TOA/TOD value is [10], the transmission end may generate a symbol corresponding to [010] in constellation.

For example, when a bit of a SIG corresponding to the $k^{th}$ subcarrier is [0] and a bit of the TOA/TOD value is [01], the transmission end may generate a symbol corresponding to [001] in constellation.

The data frame including the SIG generated as such may be transmitted from the transmission end, and the reception end may receive the data frame including the generated SIG. The reception end may demodulate the generated SIG using a PSK demodulation predetermined with the transmission end. The reception end may acquire the TOA value and/or the TOD value from the generated SIG through a receiving algorithm predetermined or determined with the transmission end.

Figure 11C:
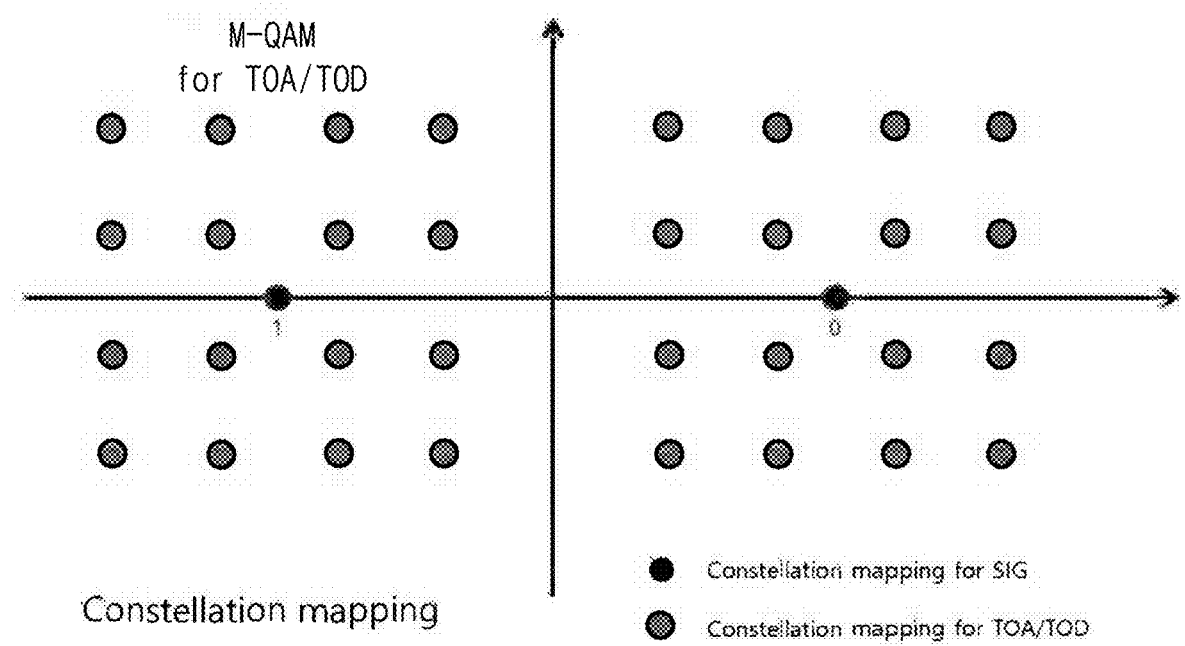
FIG. 11C is a diagram illustrating an example of constellation mapping of a signaling field (SIG) in the case of M-QAM modulation of the time of arrival (TOA) value and/or the time of departure (TOD) value.

FIG. 11C is a diagram illustrating an example of constellation mapping of a signaling field (SIG) in the case of M-ary Quadrature Amplitude Modulation (M-QAM) modulation of the time of arrival (TOA) value and/or the time of departure (TOD) value.

Referring to FIG. 11C, constellation mapping may be performed on the TOA value and/or the TOD value using a M-QAM modulation method with excellent transmitting efficiency compared with the BPSK and QPSK methods in a channel environment with a high signal to noise ratio (SNR). The transmission end may perform M-QAM modulation on information bits corresponding to the TOA value and/or the TOD value. Constellation mapping may be performed (e.g., by the transmission end) on the TOA value and/or the TOD value to overlap with bits generated by a SIG.

A data frame including the SIG generated as such may be transmitted from the transmission end, and the reception end may receive the data frame including the SIG. A SIG including a symbol to which the TOA/TOD value is mapped may be demodulated (e.g., by the reception end) using a BPSK demodulation method predetermined or determined by the reception end. The reception end may acquire the TOA value and/or the TOD value through a receiving algorithm predetermined or determined with the transmission end.

Figure 11D:
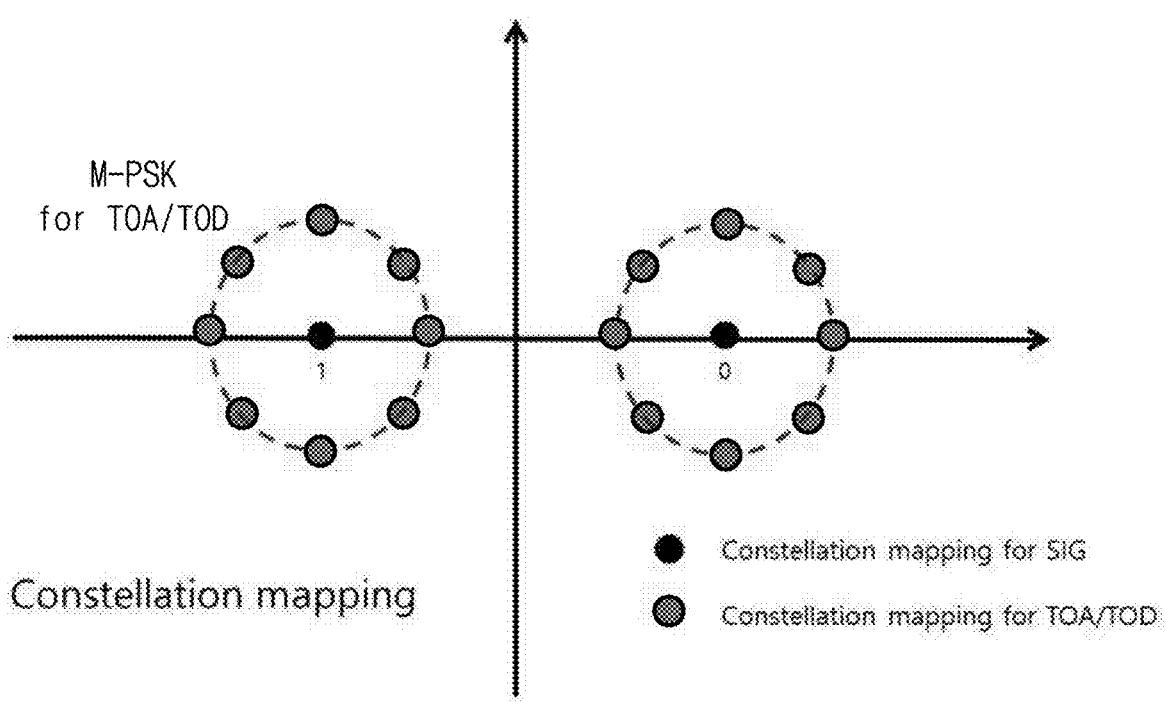
FIG. 11D is a diagram illustrating an example of constellation mapping of a signaling field (SIG) in the case of M-PSK modulation of the time of arrival (TOA) value and/or the time of departure (TOD) value.

FIG. 11D is a diagram illustrating an example of constellation mapping of a signaling field (SIG) in the case of M-ary Phase Shift Keying (M-PSK) modulation of the time of arrival (TOA) value and/or the time of departure (TOD) value.

Referring to FIG. 11D, constellation mapping may be performed on the TOA value and/or the TOD value using a M-PSK modulation method with excellent transmitting efficiency compared with the BPSK and QPSK methods in a channel environment with a high signal to noise ratio (SNR). The transmission end may perform M-PSK modulation on information bits corresponding to the TOA value and/or the TOD value. Constellation mapping may be performed (e.g., by the transmission end) on the TOA value and/or the TOD value to overlap with bits generated by a SIG.

A data frame including the SIG generated as such may be transmitted from the transmission end, and the reception end may receive the data frame including the SIG. The reception end may receive the M-PSK demodulated SIG information and may acquire the SIG information using BPSK demodulation method predetermined with the transmission end. The reception end may demodulate a SIG including a symbol to which the TOA/TOD value is mapped The reception end may acquire the TOA value and/or the TOD by demodulating the SIG including the TOA value and the TOD value through a receiving algorithm predetermined or determined with the transmission end.

Figure 12:
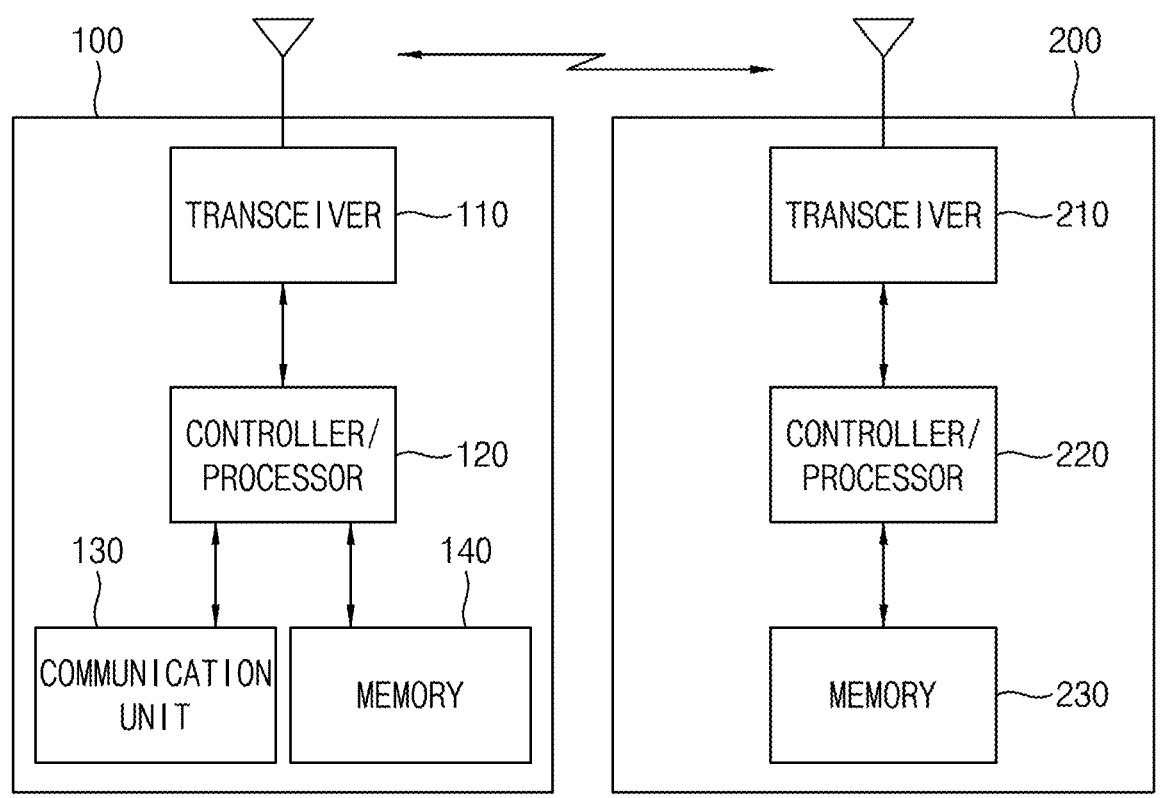
FIG. 12 is a diagram illustrating an access point (AP) 100 and a terminal (STA) 200 of a WLAN system.

FIG. 12 is a diagram illustrating an access point (AP) 100 and a terminal (STA) 200 of a WLAN system.

Referring to FIGS. 1 and 12, the access point (AP) 100 may include a transceiver 110, controller/processor 120, a communication unit 130, and/or a memory 140. FIG. 12 illustrates the case in which the access point (AP) 100 includes one transceiver 110, one controller/processor 120, one communication unit 130, and one memory 140. In an embodiment, the access point (AP) 100 includes a plurality of transceivers 110, a plurality of controllers/processors 120, a plurality of communication units 130, and/or a plurality of memories 140. The memory 140 may store a program code and/or data of a WLAN network. The transceiver 110 of the access point (AP) 100 may transmit and/or receive a frame through an antenna. The received frame may be transmitted to the controllers/processors 120. The controllers/processors 120 of the access point (AP) 100 may process the received frame. According to an embodiment of the present disclosure, the frame may be any one of a data frame, an Ack frame, a management frame, and a control frame. The controller/processor 120 may perform distance measurement processing with terminals positioned in a BSS using the TOA and TAD information of a terminal of another user, included in a preamble of the received frame.

The terminal (STA) 200 may include a transceiver 210, a controller/processor 220, and/or a memory 230. FIG. 12 illustrates the case in which the terminal (STA) 200 includes one transceiver 210, one controller/processor 220, and one memory 230. In an embodiment, the terminal (STA) 200 may include a plurality of transceivers 210, a plurality of controllers/processors 220, and/or a plurality of memories 230. The memory 230 may store a program code and/or data of a WLAN network. The transceiver 210 of the terminal (STA) 200 may transmit and/or receive various frames through an antenna. The received data frame may be transmitted to the controller/processor 220. The controller/processor 220 of the terminal (STA) 200 may process the received various frames. The controller/processor 220 may perform distance measurement processing with the access point (AP) positioned in a BSS and/or other terminals using TOA and TOD information of a terminal of another user, included in a preamble region of the received various frames.

The controller/processor 120 of the access point (AP) 100 and/or the controller/processor 220 of the terminal (STA) 200 may be implemented using, for example, digital signal processing (DSP) chips, graphic acceleration processors, and/or application specific integrated circuits (ASICs). The terminal (STA) 200 may include a display panel, a touch-screen (or touchpad), a microphone, and/or a speaker.

As such, TOA and TOD information in a preamble region with payload information as transmission target may be transmitted and received in other various frames but not an FTM frame, thereby enhancing data transfer efficiency According to embodiments of the present disclosure, when a distance between an access point (AP) and a terminal, and/or a distance between terminals, are measured, wastage of data resources may be reduced.

According to embodiments of the present disclosure, when a distance between an access point (AP) and a terminal and a distance between terminals, are measured, a time of arrival (TOA) value and a time of departure (TOD) value may be transmitted and received using frames other than a fine timing measurement (FTM) frame.

While the present disclosure has been particularly shown and described with reference to example embodiments thereof, it will be understood by those of ordinary skill in the art that various changes in form and details may be made therein without departing from the spirit and scope of the present disclosure as defined by the following claims.

What is claimed is:

1. A method of transmitting a message for measuring a distance between a first terminal and a second terminal, the first terminal and the second terminal being in a basic service set (BSS), the method comprising:
   transmitting a fine timing measurement (FTM) request frame for beginning of measurement of a distance to the second terminal by the first terminal;
   receiving an Ack frame associated with the FTM request frame from the second terminal by the first terminal;
   transmitting a first data frame to the second terminal by the first terminal;
   receiving a first Ack frame associated with the first data frame from the second terminal by the first terminal;
   transmitting a second data frame to the second terminal by the first terminal; and
   receiving a second Ack frame associated with the second data frame from the second terminal by the first terminal,
   wherein the second Ack frame received from the second terminal by the first terminal includes a time of arrival (TOA) value of the first data frame and a time of departure (TOD) value of the first Ack frame.

2. The method of claim 1, wherein the TOA value of the first data frame and the TOD value of the first Ack frame are included in a preamble region of the second Ack frame.

3. The method of claim 2, wherein the TOA value of the first data frame and the TOD value of the first Ack frame are applied to long training field (LTF) symbols of the preamble region of the second Ack frame.

4. The method of claim 3, wherein the LTF symbols include at least a first LTF symbol and a second LTF symbol, the first LTF symbol and the second LTF symbol having a phase difference corresponding to the TOD value of the first Ack frame and the TOA value of the first data frame.

5. The method of claim 4, wherein the receiving the second Ack frame through a plurality of subcarriers, each of the plurality of subcarriers corresponding to both the first LTF symbol and the second LTF symbol, each respective first LTF symbols of the plurality of subcarriers corresponding to an 802.11 standard, and for each subcarrier, the each second LTF symbol and a corresponding first LTF symbol having the phase difference.

6. The method of claim 4, wherein the receiving the second Ack frame receives the second Ack frame through a plurality of subcarriers, each of the plurality of subcarriers corresponding to both the first LTE symbol and the second LTF symbol, each respective first LTF symbol of the plurality of subcarriers corresponding to an 802.11 standard, each respective second LTF symbols of a first subset of the plurality of subcarriers having a phase difference corresponding to the TOD value of the first Ack frame, and each respective second LTF symbol of a second subset of the plurality of subcarriers having a phase difference corresponding to the TOA value of the first data frame.

7. The method of claim 4, wherein the receiving the second Ack frame receives the second Ack frame through a plurality of subcarriers, each of the plurality of subcarriers corresponding to both the first LTF symbol and the second LTF symbol, each respective first LTF symbol of the plurality of subcarriers corresponding to an 802.11 standard, and each respective second LTF symbol of the plurality of subcarriers having a phase difference of an integer multiple of a difference between the TOA value of the first data frame and the TOD value of the first Ack frame.

8. The method of claim 2, wherein
the transmitting the first data frame includes acquiring, by the first terminal, a first TOD value of the first data frame; and
the receiving the first Ack frame includes acquiring, by the first terminal, a TOA value of the first Ack frame.

9. The method of claim 8, wherein the transmitting the second data frame includes acquiring, by the first terminal, a TOD value of the second data frame.

10. The method of claim 9, wherein
the receiving the second Ack frame includes acquiring, by the first terminal, the TOA value of the first data frame and the TOD value of the first Ack frame; and
the method further comprises calculating the distance between the first terminal and the second terminal using the TOD value of the first data frame, the TOA value of the first Ack frame, the TOA value of the first data frame and the TOD of the first Ack frame.

11. A method of transmitting a message for measuring a distance between a first terminal and a second terminal, the first terminal and the second terminal being in a basic service set (BSS), the method comprising:
transmitting a first data frame to the second terminal by the first terminal, the transmitting the first data frame including acquiring a time of departure (TOD) of the first data frame;
receiving a first Ack frame associated with the first data frame from the second terminal by the first terminal, the receiving the first Ack frame including acquiring a time of arrival (TOA) of the first Ack frame;
generating a second data frame based on the TOD of the first data frame and the TOA of the first Ack frame;
transmitting the second data frame to the second terminal by the first terminal; and
receiving a second Ack frame associated with the second data frame from the second terminal by the first terminal.

12. The method of claim 11, wherein the generating generates the second data frame by applying the TOD of the first data frame and the TOA of the first Ack frame to long training field (LTF) symbols of a preamble region of the second data frame or a signaling field (SIG) symbol of the preamble region.

13. The method of claim 12, wherein the generating generates the second data frame by applying the TOD of the first data frame and the TOA of the first Ack frame to the LTF symbols, the LTF symbols including at least a first LTF symbol and a second LTF symbol, the first LTF symbol and the second LTF symbol having a phase difference corresponding to the TOD of the first data frame and the TOA of the first Ack frame.

14. The method of claim 12, wherein the generating generates the second data frame by:
applying the TOD of the first data frame and the TOA of the first Ack frame to the SIG symbol; and
modulating the SIG symbol including performing constellation mapping using a SIG bit and bits corresponding to the TOD of the first data frame and the TOA of the first Ack frame.

15. The method of claim 14, wherein the modulating modulates the SIG symbol using any one of binary phase shift keying (BPSK) modulation, quadrature phase shift keying (QPSK) modulation, M-ary Quadrature Amplitude Modulation (M-QAM) or M-ary phase shift keying (M-PSK) modulation.

16. The method of claim 12, further comprising:
transmitting a fine timing measurement (FTM) request frame to the second terminal; and
receiving a third Ack associated with the FTM request frame from the second terminal by the first terminal,
wherein the transmitting the first data frame and the transmitting the FTM request frame are performed before the acquiring the TOD of the first data frame.

17. The method of claim 12, further comprising:
receiving the first data frame from the first terminal by the second terminal, the receiving the first data frame including acquiring a TOA of the first data frame;
transmitting the first Ack frame to the first terminal by the second terminal, the transmitting the first Ack frame including acquiring a TOD of the first Ack frame;
acquiring the TOD of the first data frame and the TOA of the first Ack using the second data frame; and
calculating, by the second terminal, a distance to the first terminal using the TOA of the first data frame, the TOD of the first Ack frame, the TOD of the first data frame and the TOA of the first Ack frame.

18. A method of transmitting a message for measuring a distance between a first terminal and a second terminal, the first terminal and the second terminal being in a basic service set (BSS), the method comprising:
transmitting a fine timing measurement (FTM) request frame between the first terminal and the second terminal; and
transmitting and receiving at least two frames between the first terminal and the second terminal after the transmitting the FTM request frame, each of the at least two frames
including a payload region and a preamble region, each respective preamble region including long training field (LTF) symbols or a signaling field (SIG) symbol, the SIG symbol corresponding to a time of arrival (TOA) value and a time of departure (TOD) value,
the LTF symbols including at least a first LTF symbol and a second LTF symbol, and the first LTF symbol and the second LTF symbol having a phase difference corresponding to the TOA value and the TOD value.

19. The method of claim 18, wherein the SIG symbol is modulated including performing constellation mapping mapped to a constellation and modulated using a SIG and bits corresponding to the TOA value and the TOD value.

20. The method of claim 18, wherein each of the at least two frames are any one of a data frame, an Ack frame or a null data packet (NDP) frame.

* * * * *